C. E. PECZENIK.
VEHICLE BODY AND ROOF.
APPLICATION FILED AUG. 6, 1920.
1,413,424.
Patented Apr. 18, 1922.
2 SHEETS—SHEET 2.
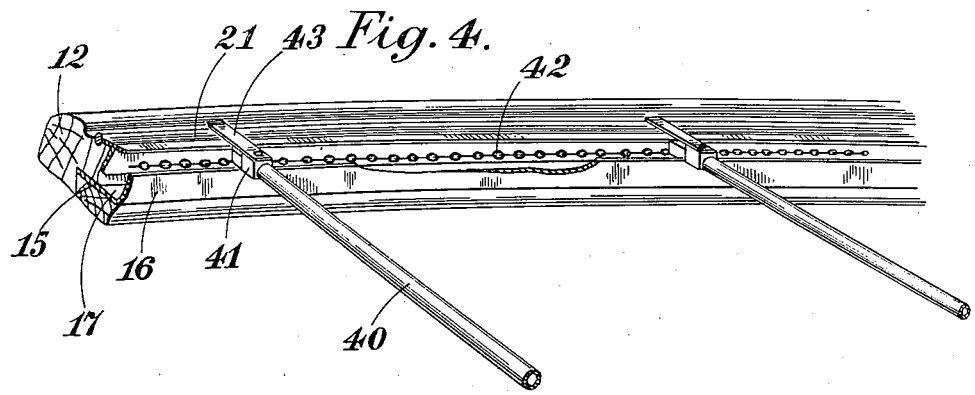
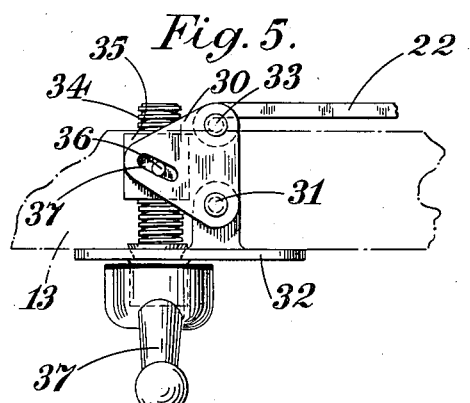
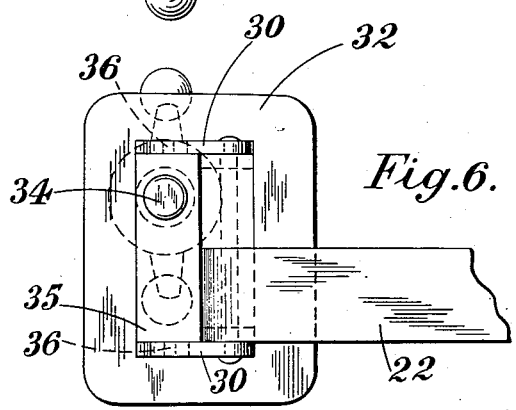
Inventor
Charles Edmund Peczenik
by his attorneys

UNITED STATES PATENT OFFICE.

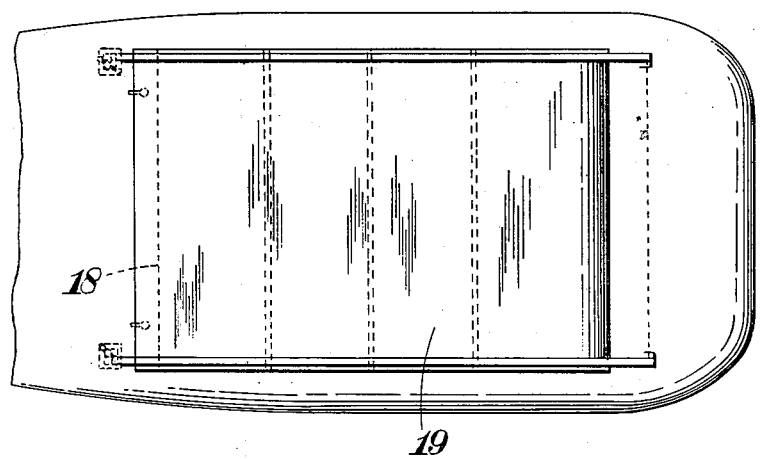
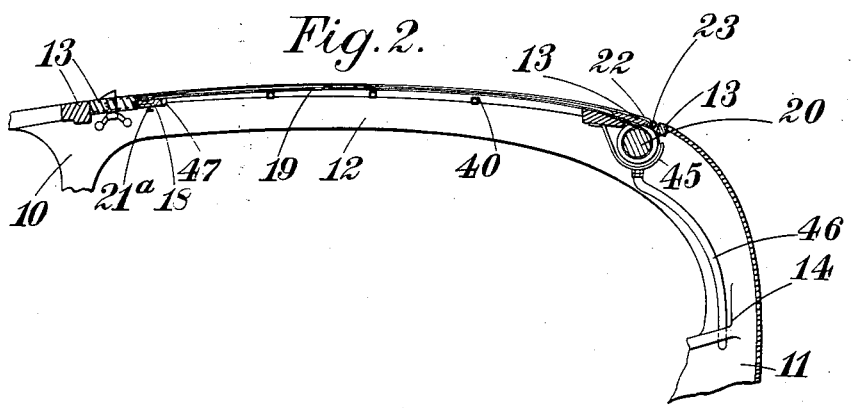
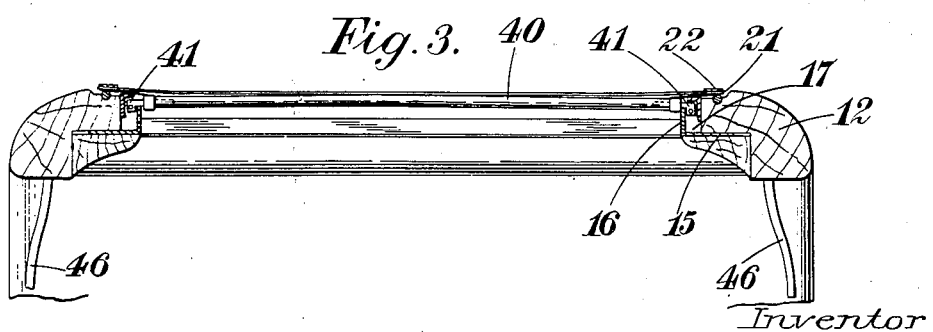

CHARLES EDMUND PECZENIK, OF LONDON, ENGLAND.

VEHICLE BODY AND ROOF.

1,413,424.  Specification of Letters Patent.  Patented Apr. 18, 1922.

Application filed August 6, 1920. Serial No. 401,605.

*To all whom it may concern:*

Be it known, that I, CHARLES EDMUND PECZENIK, a subject of the King of England, residing at London, England, have invented certain new and useful Improvements in Vehicle Bodies and Roofs, of which the following is a specification.

This invention is for improvements in or relating to vehicle bodies and roofs, and is particularly applied to the bodies of motor-vehicles. It is desirable in motor-vehicles to provide a body which can be used wholly open in fine weather, but which can be easily closed when required, such bodies being known as "all weather" bodies. As hitherto made, such bodies have not been altogether successful, mainly owing to the serious vibration of the movable parts which takes place when the car is in motion and to draughts and leakages due to the lack of rigidity in construction. Other forms using a leather hood or other flexible cover, which is supported by hinged uprights also offer certain disadvantages. It is the object of the present invention to provide an improved construction of car body with a removable roof.

According to this invention there is provided in a vehicle the combination with the body, of a permanent rigid roof-frame, and a detachable roof, which may be rigid but is preferably flexible, adapted to slide thereon or therein into an open or a closed position.

According to another feature of this invention, a flexible roof, for example made of leather or waterproof woven fabric is used in conjunction with a roller whereon it can be wound when it is required to open the roof of the vehicle. The roller is preferably spring-controlled so that the winding-up operation is done automatically.

According to yet another feature of the invention, a flexible roof-member as aforesaid, overlaps the cant-rails of the fixed frame and is provided with clamping means whereby its margins may be pressed down on to the cant-rails to make a water-tight joint therewith. The clamping device is conveniently constituted by a rod movable away from and towards the cant-rail with the margin of the roof engaged between the two of them, there being one of such devices for each cant-rail. Preferably the rod is a flexible one, having one end held against longitudinal movement but free to turn in a vertical plane, and provided at its other end with an adjusting and locking device: this device is arranged to move the free end of the rod towards the other end so as to cause the rod to be bowed outwards from the cant-rail and release the roof-member. The opposite movement draws the rod tightly down on the cant-rail to clamp the roof in position.

According to still another feature of the invention there are provided in combination with the flexible roof as above-described, hoop-sticks which extend between the cant-rails underneath the flexible roof to support it, and they are arranged to slide longitudinally in the cant-rails when the flexible roof is wound up on or unwound from its roller. These hoop-sticks are preferably located with respect to one another by means of inextensible flexible chains.

In the accompanying drawings which illustrate one embodiment of this invention,

Figure 1 is a plan of so much of a motor car body as is necessary to illustrate the invention;

Figure 2 is a central vertical longitudinal section of Figure 1;

Figure 3 is a transverse section of the roof of the vehicle looking towards the rear; this view is to a larger scale than Figures 1 and 2;

Figure 4 is a perspective view showing certain details of construction, and

Figures 5 and 6 are an elevation and plan respectively of the adjusting and locking means for the clamping device above-referred to.

Like reference characters indicate like parts throughout the drawings.

Referring to Figures 1, 2 and 3 which illustrate the upper part of what is known as a limousine body, the body is provided at its front and rear ends with permanent rigid upright frames 10 and 11 situated at the four corners respectively, and longitudinal side-frames or cant-rails 12 connect the tops of these uprights together. Permanent transverse members indicated at 13 are also provided at the front and rear of the body connecting the respective uprights together. A wind screen or window of any desired type may be fitted at the forward end of this permanent roof frame 12, 13, and the rear wall of the body 14 may be extended upwards as far as the rear transverse member 13; this rear wall 14 may be provided if so desired with a window which may be fixed or arranged to open. The upper side walls of the body, which are not illustrated, may be constituted by sliding windows of any ordinary or desired type and the uprights wherein these windows slide are preferably adjustable; they may for example be hinged to the upper edge of the lower part of the body and arranged to swing up to engage the cant-rails 12, or they may be arranged to slide up and down within the side walls of the body, or again they may be hinged between the side walls of the body and turn up in the plane of the wall. Such constructions are well known and are therefore not illustrated.

The cant-rails may be of any desired construction, for example such as is illustrated in Figures 3 and 4 in which each is provided with a flanged member 15 secured on it with the flange 16 spaced away from the inner edge of the cant-rail to provide a channel 17. This channel 17 extends longitudinally from the front transverse member 13 to the corresponding rear transverse member, and the upper edge of the flange 16 serves as a runway for the ends of a rigid transverse member 18 (see Figure 2) which extends between the two cant-rails. This member has secured upon it the front edge of a sheet of waterproof material 19 which is of a width somewhat greater than the gap between the cant-rails and is of a length sufficient to extend from the rear transverse member 13 to the forward transverse member 13. The other end of the flexible sheet 19 is secured upon a spring-controlled roller 20, like a roller-blind, the roller being situated in a suitable casing mounted on the underside of the rear transverse member 13.

The member 18 aforesaid which slides on the cant-rails can be traversed towards the back of the vehicle when it is desired to have the roof open, and the flexible sheet is then automatically wound up on the spring roller 20. If it is desired to close the roof of the vehicle the member 18 is drawn forward to meet the front transverse member 13, and it is preferably locked thereto by any suitable form of lock or the catch indicated at 21ª. Finger pieces 47 may be provided on the member 18 to facilitate its operation. When the member 18 is thus drawn forward the flexible sheet 19 is drawn off the roller 20 and entirely closes the roof, as hereinafter described.

As previously stated the sheet 19 is of greater width than the gap between the cant-rails and the overlapping margins of the sheet are clamped down on to the upper surface of the cant-rails to ensure that a water-tight joint is made.

For this purpose a yielding packing 21, illustrated as a strip of rubber of circular section may be provided on the upper surface of each cant-rail, in such a position that the margin of the flexible sheet lies over it. Preferably a separate clamping device is used on each cant-rail and it is preferably constituted by a rod 22 which may be of flat or curved cross-section and is flexible or semi-flexible. The rear end of this rod 22 is fixed as at 23 to the rear transverse member 13, and each rod 22 extends to the front transverse member 13. The forward end of each rod is secured to an adjusting and locking device which is arranged to move that end of the rod towards or away from the rear fixed end. When the two ends of the rod are moved towards one another, the rod is bowed upwardly so that it is spaced away from the cant-rail, and the flexible roof can be freely moved. When the free end of the rod 22 is moved away from the other end, the rod is drawn down on to the margin of the flexible roof and clamps it between the rod and the packing 21 aforesaid.

An adjustable mounting of the forward end of the rod 22 is illustrated in Figures 5 and 6. A pair of plate-members 30 are pivoted at 31 on a bracket 32 secured to the front transverse member 13, and the front end of the rod 22 is secured at 33 to this member 30. A screw-threaded member 34 is rotatably mounted in the bracket 32 and it carries a nut member 35 which can be traversed along the member 34 by rotation of the latter. The member 35 carries laterally extending pins 36 which engage slots 37 formed in the plate members 30 so that when the nut member 35 is traversed it causes the plates 30 to be rocked on their pivotal mounting 31 and thereby adjust the position of the connection 33 at the end of the rod 22.

As shown most clearly in Figure 6 the screw-threaded member 34 is offset from the longitudinal axis of the rod 22 and the nut member 35 is of sufficient length to overlap both of them, the reason for this construction is to bring the member 34 into such a position that the handle or portion 37 by which it is operated is removed from too close proximity to the side walls or cant-rails of the body.

The precise construction of this adjusting device may be varied without departing from the present invention, although in general, a bell crank or equivalent device is preferably used.

In order to prevent sagging of the flexible roof 19 there are provided a number of hoop-sticks 40 which are spaced apart underneath the flexible roof to support it. These hoop-sticks 40 are conveniently constituted by tubular members as shown in Figure 4 provided at their ends with blocks 41 which slide on the upper edges of the flanges 16 aforesaid. The blocks may be L-shaped as shown in Figure 3 so as to overhang each of the flanges 16 and prevent the hook-sticks 40 from becoming disengaged from the flanges 16. The various blocks 41 are connected together and also to the member 18 by flexible but inextensible chains 42 which are conveniently located in the channels 17. The hoop-sticks are further provided with flat strip-like members 43 which extend across the packing 21 aforesaid and lie between it and the marginal edge of the flexible roof.

When the flexible roof 19 has been drawn off its roller by the forward movement of the member 18, the hook-sticks are drawn forward into their correct positions by the chains 42. When the flexible roof 19 is wound up on the roller 20 the transverse member 18 is traversed towards the rear of the vehicle; in so doing it picks up and pushes in front of it each of the hoop-sticks successively so that they are all grouped together at the back of the vehicle near the rear transverse member 13. The chains 42 lie loosely in the channel 17.

The watertight fitting of the flexible roof is ensured as to its longitudinal edges by the clamping device above-mentioned on each side. At its forward end it is rendered watertight by the engagement of the member 18 with the member 13 and at its rear edge where it passes on to the spring roller 20 provision is made to trap any water which may enter, in a trough or casing 45 which contains the spring roller; any water collecting in this trough is conveyed by a gutter or pipe or pipes 46 situated in the rear wall of the vehicle to any suitable discharge point.

While the preferred construction is the one above-described, it also lies within the scope of this invention to use a sliding or detachable rigid roof which may be made of one piece or in sections, being secured to the rigid roof-frame in any desired manner.

It will be seen that the above invention provides a construction of vehicle body which can be used as either an open or a closed vehicle, and the construction is such that no parts are likely to become loose and cause unpleasant rattling or drumming. When the vehicle is closed all the parts of the roof are clamped in place so that they are free from vibration or relative movement one to the other, and when it is open they are all packed together at the rear end of the vehicle the flexible roof being wound on to the roller. The flexible roof itself is not creased or bent either when in use or out of use, so that the principal cause of deterioration of such parts is removed. Adequate provision is made to ensure the whole roof being watertight when it is closed, and finally, since the roof frame is rigid and integral with the body it can be more lightly made of adequate strength than if it were itself made detachable or adjustable; similarly the uprights not being required to carry the height of the roof can be made very light.

What I claim as my invention and desire to secure by Letters Patent is:—

1. In a vehicle, the combination with the body of a permanent rigid roof frame mounted thereon, and including side members, a flexible roof adapted to be drawn over and close said frame and to overlap the side members thereof, means extending throughout the length of the roof for clamping the overlapping portions closely to the said side members to form a watertight joint, a container for said flexible roof, which container also serves as a receptacle for moisture draining off the roof, and a drain pipe to discharge the moisture from said container outside the body of the vehicle.

2. In a vehicle, the combination with the body, of a permanent rigid roof frame mounted thereon and including cant rails, a flexible roof adapted to be drawn over and close said frame and to overlap the cant rails thereof, a rod mounted above each cant rail extending along the length thereof, means for moving each of said rods away from its cant rail to permit the entry between them of the margin of the said flexible roof, means for moving each of said rods down on to said margin to clamp it against the cant rail in a watertight manner, a container for said flexible roof, which container also serves as a receptacle for moisture draining off the roof, and a drain pipe to discharge the moisture from said receptacle outside the body of the vehicle.

3. In a vehicle, the combination with the body, of a permanent rigid roof frame mounted thereon, and including cant rails, a flexible roof adapted to be drawn over and close said frame and to overlap the cant rails thereof, a flexible rod hinged about a horizontal axis at one end of each cant rail, means at the other end of each cant rail engaging the other end of said rod to move it towards or away from its hinged end, a container for said flexible roof, which container also serves as a receptacle for moisture draining off the roof, and a drain pipe to discharge said moisture outside the body of the vehicle.

4. In a vehicle the combination with the body, of a permanent rigid roof frame mounted thereon and including cant rails, transverse hoop sticks supported on the cant rails of said roof frame and adapted to slide therealong, a flexible roof adapted to be drawn over and close said frame, said roof in such position resting on said hoop sticks and overlapping the cant rails, means extending throughout the length of the roof for clamping the said overlapping portions closely to the cant rails to form a watertight joint, and means for draining moisture off the said roof to outside the body of the vehicle.

5. In a vehicle, the combination with the body, of a permanent rigid roof frame mounted thereon and including cant rails, transverse hoop sticks mounted to slide longitudinally on said cant rails, flexible inextensible members connecting said hoop sticks to one another, a flexible roof adapted to be drawn over said frame, said roof in such position resting upon said hoop sticks and said cant rails, a rigid transverse member secured on the forward edge of said flexible roof, flexible inextensible members connecting said rigid member to the nearest of said hoop sticks, means extending throughout the length of the roof for clamping the overlapping margins of said roof closely to the said cant rails to form a watertight joint, and means for draining moisture off the roof to outside the body of the vehicle.

In testimony whereof I affix my signature.

CHARLES EDMUND PECZENIK.